(12) United States Patent
Bierce Argy

(10) Patent No.: US 11,833,787 B2
(45) Date of Patent: Dec. 5, 2023

(54) PIPE FOR CONVEYING A FLUID FOR A VEHICLE

(71) Applicant: HUTCHINSON, Paris (FR)

(72) Inventor: Gwenaelle Bierce Argy, Ferrieres en Gatinais (FR)

(73) Assignee: HUTCHINSON, Paris (FR)

( * ) Notice: Subject to any disclaimer, the term of this patent is extended or adjusted under 35 U.S.C. 154(b) by 0 days.

(21) Appl. No.: 18/059,657

(22) Filed: Nov. 29, 2022

(65) Prior Publication Data
US 2023/0166483 A1 Jun. 1, 2023

(30) Foreign Application Priority Data
Dec. 1, 2021 (FR) .................................... 2112816

(51) Int. Cl.
| | |
|---|---|
| *B32B 25/04* | (2006.01) |
| *B32B 1/08* | (2006.01) |
| *B32B 7/12* | (2006.01) |
| *B32B 25/14* | (2006.01) |

(52) U.S. Cl.
CPC .............. *B32B 25/042* (2013.01); *B32B 1/08* (2013.01); *B32B 7/12* (2013.01); *B32B 25/14* (2013.01); *B32B 2250/03* (2013.01); *B32B 2250/248* (2013.01); *B32B 2264/108* (2013.01); *B32B 2264/1021* (2020.08); *B32B 2305/08* (2013.01); *B32B 2307/3065* (2013.01); *B32B 2605/00* (2013.01)

(58) Field of Classification Search
CPC ........... B32B 25/042; B32B 1/08; B32B 7/12; B32B 25/14; B32B 2250/03; B32B 2250/248; B32B 2264/1021; B32B 2264/108; B32B 2305/08; B32B 2307/3065; B32B 2605/00

See application file for complete search history.

(56) References Cited

U.S. PATENT DOCUMENTS

| | | | |
|---|---|---|---|
| 6,406,767 B1 * | 6/2002 | Mueller | .............. C08L 23/0853 428/36.9 |
| 2018/0313489 A1 | 11/2018 | D'Hondt | |
| 2020/0182381 A1 | 6/2020 | Ikehara | |

FOREIGN PATENT DOCUMENTS

| | | |
|---|---|---|
| EP | 3685999 A1 | 7/2020 |
| GB | 2545440 A | 6/2017 |

* cited by examiner

*Primary Examiner* — Michael C Miggins
(74) *Attorney, Agent, or Firm* — BROWDY AND NEIMARK, P.L.L.C.

(57) ABSTRACT

The invention relates to a pipe for conveying a fluid, in particular a coolant, for a vehicle, the pipe having a multi-layer structure and comprising:
- an inner layer defining an inner passage for fluid circulation, the inner layer being formed of a first material comprising an elastomer selected from the ethylene-propylene copolymers,
- an outer layer formed of a second material comprising:
- an elastomer selected from ethylene-vinyl acetate copolymers in a proportion of at least 50 phr, and
- a flame retardant according to a proportion of at least 50 phr, and
- an intermediate bonding layer arranged between the inner layer and the outer layer and comprising a mixture of an ethylene-propylene copolymer with an ethylene-vinyl acetate copolymer or a polyacrylate or an ethylene acrylate copolymer.

15 Claims, 1 Drawing Sheet

PIPE FOR CONVEYING A FLUID FOR A VEHICLE

TECHNICAL FIELD OF THE INVENTION

The invention relates to the field of pipes for transporting a fluid, for example a coolant, for vehicles, such as motor vehicles.

More particularly, the invention relates to the field of pipes for conveying a coolant for a low-temperature, low-pressure cooling circuit for motor vehicles.

TECHNICAL BACKGROUND

The prior art is illustrated by the documents GB-A-2 545 440, EP-A1-3 685 999, US-A1-2018/313 489, US-A1-2020/182 381.

A motor vehicle classically comprises a cooling circuit, in particular a low temperature and low-pressure circuit. By low temperature and low pressure is meant a temperature inside the circuit of between −30° C. and 120° C. and a pressure inside the circuit of between $1·10^5$ Pa and $5·10^5$ Pa. The cooling circuit uses pipes for conveying a coolant. The coolant is for example a heat transfer liquid such as a glycol-based liquid.

Such pipes must meet various constraints which make the choice of materials for these pipes more complex.

Indeed, the pipe must have resistance characteristics with respect to the fluid conveyed under the given temperature and pressure conditions. The material of the pipe must therefore be resistant to the chemical species that make up the cooling liquid under the pressure and temperature conditions under which the fluid is conveyed in order to guarantee the tightness of the pipe over a given period of time.

Furthermore, the pipe must have mechanical properties compatible with the environment in which it is used. In particular, the material of the pipe must be sufficiently flexible to provide pipes with complex shapes adapted to the dimensions of the vehicle. Also, the pipe must be able to dampen vibrations to ensure the integrity of the circuit over the given period of time.

In addition, the pipe must be fire resistant. In particular, the material used in the pipe must meet Underwriters Laboratories Standard 94 (UL94). The standard 94 has two main categories of tests that qualify the fire resistance of a polymeric material. The first category is a horizontal burning test (HB) and the second category is a vertical burning test which is more severe than the horizontal burning test. In the vertical burning test, several criteria are used to classify polymeric materials as V-0, V-1 or V-2. Nowadays, the automotive manufacturers require materials that meet at least the vertical burning test of the UL 94 standard in the index V-0.

In order to meet all the required conditions, such pipes are typically formed of a plurality of concentric layers. Each layer provides a specific function. Typically, the pipe comprises an inner layer defining an inner passage for fluid circulation and an outer protective layer. The inner layer must provide resistance to the coolant while the outer layer must provide fire resistance to UL94 V-0 standard. Finally, the combination of these layers must have the necessary flexibility to allow the pipe to dampen the vibrations.

Certain polymeric materials of the thermoplastic type are known to meet the requirements of the UL94 V-0 standard. These materials have a level of fire resistance in accordance with the above standard. However, the use of thermoplastics in the field of the invention does not provide complete satisfaction. Thermoplastics have insufficient flexibility and vibration resistance for use as an outer layer in such pipes.

In this context, there is a need to provide a pipe for conveying a fluid, in particular a coolant, for a vehicle, which is resistant to fire, to the conveyed fluid and which has the required mechanical properties.

SUMMARY OF THE INVENTION

To this end, the invention proposes a pipe for conveying a fluid, in particular a coolant, for a vehicle, the pipe having a multi-layer structure and comprising:
- an inner layer defining an inner passage for fluid circulation, the inner layer being formed of a first material comprising an elastomer selected from ethylene-propylene copolymers,
- an outer layer formed of a second material comprising:
  - an elastomer selected from ethylene-vinyl acetate copolymers according to a proportion of at least 50 phr, and
  - a flame retardant in a proportion of at least 50 phr, and
- an intermediate bonding layer arranged between the inner layer and the outer layer and comprising a mixture of an ethylene-propylene copolymer with an ethylene-vinyl acetate copolymer or a polyacrylate or an ethylene acrylate copolymer.

The pipe according to the invention thus has an inner layer of an elastomer selected from ethylene-propylene copolymers. The ethylene-propylene copolymers have the advantage of being resistant to the coolant conveyed under the temperature and pressure conditions of a cooling circuit, in particular a low pressure, low temperature circuit. Also, such elastomers have the advantage of guaranteeing a flexibility of the inner layer compatible with the vibrations.

The pipe further comprises an outer layer formed of a second material comprising an elastomer selected from ethylene-vinyl acetate copolymers in a proportion by weight of at least 50 phr. The elastomer making up the second material is therefore predominantly an ethylene-vinyl acetate copolymer. It has been found that, unlike ethylene-propylene copolymer, such an elastomer has the advantage of being fire-resistant. It has also been found that such an elastomer has a remarkable thermal resistance, which allows to guarantee the integrity of the outer layer under the temperature conditions of use of the pipe.

In addition, the second material making up the outer layer comprises a flame retardant in a proportion of at least 50 phr. The flame retardant improves the fire resistance of the outer layer. It has been found that, in such a proportion, the fire resistance of the outer layer is significantly improved without degrading the flexibility of the outer layer. In particular, the outer layer according to the invention complies with the UL 94 standard vertical burning test according to the index V-0.

Furthermore, according to the invention, the pipe comprises an intermediate bonding layer. The intermediate bonding layer allows to reinforce the adhesion of the inner and outer layers, which are formed of two distinct elastomers. The cohesion of the pipe is ensured by the presence of this layer.

The pipe according to the invention therefore comprises elastomer layers which ensure sufficient flexibility to resist, for example, vibrations. In addition, the pipe according to the invention is resistant to the chemical species making up the conveyed fluid and to fire as required by the UL94 V-0 standard.

The invention may comprise one or more of the following features, taken in isolation from each other or in combination with each other:
- the flame retardant is selected from metal hydroxides, for example aluminium hydroxide or magnesium hydroxide or a mixture thereof,
- the flame retardant is selected from phosphorus compounds, for example organophosphorus compounds or nitrogen phosphorus compounds or chlorophosphates or metal phosphinates or a mixture thereof,
- the proportion of flame retardant is at least 70 phr, preferably at least 100 phr,
- the second material comprises reinforcing fillers,
- the reinforcing fillers comprise silica in a proportion less than or equal to 50 phr, preferably less than or equal to 40 phr,
- the second material comprises additives, the proportion of each additive being less than or equal to 10 phr, preferably less than or equal to 5 phr,
- the additives comprise carbon black,
- the second material is vulcanized with peroxide,
- the second material is free of elastomer selected from ethylene-propylene copolymers,
- the ethylene-propylene copolymer of the first material is an ethylene propylene terpolymer and a non-conjugated diene,
- the proportion of the ethylene-propylene copolymer of the first material is 100 phr,
- the proportion of ethylene-vinyl acetate of the second material is at least 70 phr, preferably 100 phr,
- a reinforcing layer arranged between the outer layer and the intermediate layer or embedded in the outer layer.

The invention also relates to a cooling circuit for a vehicle, comprising a pipe according to any of the preceding features.

The invention also relates to a method of manufacturing a pipe as described above, characterized in that it comprises the following steps of: forming the inner layer, forming the intermediate layer around the inner layer, forming the outer layer, and vulcanizing the inner, intermediate and outer layers.

Advantageously, the method comprises, after the vulcanisation step, a step of post-curing the pipe.

The invention also relates to the use of a pipe according to any one of the preceding features, for the transport of a coolant.

BRIEF DESCRIPTION OF THE FIGURES

Further features and advantages will be apparent from the following description of a non-limiting embodiment of the invention with reference to the attached drawings in which.

DETAILED DESCRIPTION OF THE INVENTION

Figure 1:
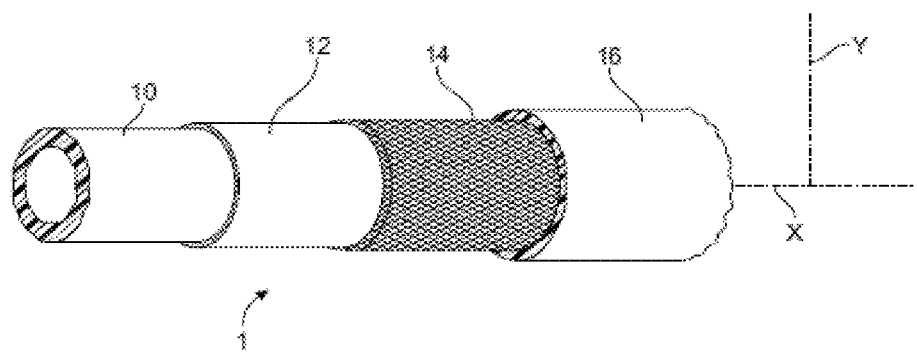
FIG. 1 is a schematic perspective representation of a pipe according to an example embodiment of the invention.

FIG. 1 shows a pipe 1 according to an example embodiment of the invention. The pipe 1 has a longitudinal axis X.

In the present invention, the terms "inside", "inner", "outside", "outer", are understood with respect to a transverse axis Y perpendicular to the longitudinal axis X, and with respect to the distance from the longitudinal axis X along this transverse axis Y. The terms "outside" and "outer" are understood to mean relatively further away from the longitudinal axis X along the transverse axis Y, while the terms "inner" and "inside" are understood to mean relatively closer to the longitudinal axis X along the transverse axis Y.

In the present invention, the unit "phr" is known as a unit of measurement defining the proportion by weight of a constituent of a material per hundred parts by weight of elastomer in the material. Thus, a material comprising a filler in a proportion of 70 phr refers to a material comprising 70 g of filler per 100 g of elastomer.

The pipe 1 is intended for conveying a fluid. The fluid is for example a coolant. The fluid is for example a cooling liquid. The cooling liquid is for example a glycol-based liquid. The cooling liquid comprises for example a mixture of water and glycol.

The conveyed fluid is for example at a pressure between $1 \cdot 10^5$ Pa and $5 \cdot 10^5$ Pa and a temperature between −30° C. and 120° C.

The temperature outside the pipe 1 is for example between −30° C. and 150° C.

The pipe 1 is multi-layered. It comprises a plurality of layers concentric around the longitudinal axis X.

The pipe 1 has for example an inner diameter of between 10 mm and 100 mm and preferably between 10 mm and 50 mm.

The pipe 1 comprises an inner layer 10 defining an inner passage for fluid circulation. The inner layer 10 has a thickness as measured along the transverse axis Y of between 0.5 mm and 5 mm.

The inner layer 10 is formed of a first material comprising an elastomer selected from ethylene-propylene copolymers.

Preferably, the ethylene-propylene copolymer is a ethylene propylene terpolymer and a non-conjugated diene (EPDM).

The non-conjugated diene is for example dicyclopentadiene, 1,4-hexadiene, 5-ethylidene-2-norbornene, 5-methylene-2-norbornene, 1,5-cyclooctadiene. Advantageously, the non-conjugated diene is 5-ethylidene-2-norbornene. Advantageously, the non-conjugated diene units represent between 0.5% and 20% by weight of the elastomer.

Advantageously, the propylene units represent between 10% and 80%, preferably from 15% to 70% by weight of the elastomer.

Advantageously, the ethylene units represent between 20% and 90%, preferably between 30% and 70% by weight of the elastomer.

Preferably, the first material comprises a blend of elastomers selected from ethylene-propylene terpolymers and a non-conjugated diene. The terpolymers of ethylene-propylene and a non-conjugated diene of the first material may differ in, for example, the proportion of non-conjugated diene units and/or the proportion of propylene units and/or the proportion of ethylene units.

Preferably, the proportion of elastomer in the first material is 100 phr.

The ethylene-propylene copolymers have the advantage of being resistant to the coolant under the aforementioned temperature and pressure conditions. In fact, certain elastomers such as ethylene and vinyl acetate (EVA) copolymers swell in the presence of the coolant under the aforementioned conditions of temperature and pressure, which means a poor resistance of the material to the conveyed fluid.

Preferably, the first material further comprises reinforcing fillers. The proportion of reinforcing fillers in the first material is between 50 phr and 200 phr. The reinforcing fillers comprise for example carbon black, silica, kaolin, chalk or a mixture thereof. The reinforcing fillers are in the form of nanoparticles.

Preferably, the first material further comprises additives. The proportion of additives in the first material is between 100 phr and 250 phr. The additives include, for example, plasticisers, or pigments, protective agents such as antioxidants.

The first material is advantageously vulcanised. The first material may be vulcanised with peroxide or sulphur. Preferably, the first material is vulcanized with peroxide. The first material thus comprises vulcanizing agents comprising a peroxide. The peroxide is for example selected from 1,3 1,4bis(terbutylperoxyisopropyl)benzene, di-(2 tertiarybutyl isopropyl)benzene peroxide, a dicumyl peroxide and (1,1' di tertiarybutylperoxy)-3,3,5-trimethylcyclohexane. Advantageously, the first material comprises vulcanisation activators comprising for example cyanurate such as triallyl cyanurate (TAC) or triallyl isocyanurate (TAIC).

The pipe 1 according to the invention further comprises an outer layer 16. The outer layer 16 is arranged outside the inner layer 10. The outer and inner layers 16, 10 are coaxial. Preferably, the outer layer 16 is the outermost layer 16 of the pipe 1. The outer layer 16 has a thickness as measured along the transverse axis Y of between 0.5 mm and 5 mm.

The outer layer 16 complies with at least the vertical burning test of the UL94 standard, and in particular with the index V-0 (UL 94 Standard, published 14 Feb. 2013).

The outer layer 16 is formed from a second material. The second material differs from the first material. The second material comprises an elastomer in a proportion of at least 50 phr, preferably at least 70 phr and even more preferably 100 phr.

According to the invention, the elastomer of the second material is selected from ethylene vinyl acetate (EVA) copolymers. By copolymer of ethylene and vinyl acetate is meant any copolymer based on these two monomers as main or majority components. Preferably, the vinyl acetate units represent at least 50% by weight of the elastomer and preferably 60% by weight of the elastomer.

The second material may comprise a blend of ethylene and vinyl acetate copolymers, the ethylene and vinyl acetate copolymers differing for example in the proportion by weight of vinyl acetate units.

Preferably, the second material comprises a total proportion of elastomer of 100 phr. Thus, preferably, the second material comprises a majority of the elastomer being a copolymer of ethylene and vinyl acetate.

Preferably, the second material is free of ethylene-propylene copolymers and in particular ethylene-propylene terpolymers and a non-conjugated diene. Indeed, these elastomers have a poor fire resistance and it has been found that the presence of this family of elastomers in the second material greatly degrades the fire resistance of the outer layer 16.

According to the invention, the second material further comprises a flame retardant in a proportion of at least 50 phr, preferably at least 70 phr and even more preferably 100 phr.

The flame retardant allows to reinforce the fire resistance of the outer layer 16. Advantageously, the proportion of flame retardant is between 50 phr and 100 phr. Above 100 phr, it has been found that the mechanical properties of the outer layer 16 are strongly degraded. Below 50 phr, it was found that the fire resistance of the outer layer 16 is not satisfactory.

The flame retardant is for example in the form of microparticles. The microparticles advantageously have a D50 between 0.5 µm and 1 µm, preferably a D50 of 0.9 µm as measured by laser diffraction.

According to a preferred example of the invention, the flame retardant is selected from metal hydroxides such as aluminium hydroxide ($Al(OH)_3$), or magnesium hydroxide ($Mg(OH)_2$) or a mixture thereof.

According to another example of the invention, the flame retardant is selected from phosphorus compounds. According to the present invention, a phosphorus compound is a compound comprising at least one phosphorus atom. The phosphorus compounds are for example organophosphorus compounds such as a phosphate, or nitrogen phosphorus compounds, or chlorophosphates, or metal phosphinates or a mixture thereof.

According to another example of the invention, the flame retardant is selected from halogenated compounds such as a polybrominated diphenyl ether (PBDE) in combination with an antimony oxide.

According to yet another example of the invention, the flame retardant comprises a mixture of metal hydroxides, phosphorus compounds and halogenated compounds.

Advantageously, the second material further comprises a fire retardant in a proportion of, for example, less than 5 phr. The fire retardant comprises for example calcium stearate according to a proportion of for example 1.5 phr.

According to a preferred example of the invention, the second material comprises reinforcing fillers. The proportion of reinforcing fillers in the second material is preferably less than 50 phr. The reinforcing fillers are in the form of nanoparticles. The reinforcing fillers comprise for example kaolin, chalk, silica or a mixture thereof.

The proportion of silica in the second material is less than or equal to 50 phr, preferably less than or equal to 40 phr, more preferably 35 phr. The silica is for example precipitated silica.

Preferably, the second material further comprises additives. The proportion of each additive in the second material is less than or equal to 10 phr, preferably less than or equal to 5 phr. The additives include, for example, pigments, protective agents such as antioxidants and coupling agents.

As pigments, the carbon black can be mentioned in a proportion of less than or equal to 10 phr, preferably less than or equal to 5 phr. The carbon black is for example of the N550 series. The low proportion of carbon black allows to improve the fire resistance of the outer layer 16, since the carbon black represents a combustible which degrades the fire resistance.

As antioxidants, the 2,2,4-trimethyl-1,2-dihydroquinoline can be mentioned in a proportion of 1.5 phr. The antioxidant is for example Permanax TMQ.

As coupling agents, the functionalized silane compounds can be mentioned.

For example, the additives may also include a stearamine compound in a proportion of 1 phr such as the Armeen 18D, a moulding agent such as Moulex® RI 04 in a proportion of 0.8 phr and/or a processing agent such as stearic acid in a proportion of 1 phr.

The second material is vulcanised. The second material may be vulcanised with sulphur. Preferably, the second material is vulcanized with peroxide. The second material thus comprises vulcanizing agents comprising a peroxide. The proportion of peroxide is between 1 phr and 10 phr, preferably between 2 phr and 5 phr and even more preferably 3 phr. The peroxide is chosen, for example, from organic peroxides.

The second material advantageously comprises vulcanisation activators in a proportion of less than 5 phr. The vulcanisation activators comprise, for example, cyanurate such as triallyl cyanurate (TAC) or triallyl isocyanurate (TAIC) or a mixture of trimethylolpropane trimethacrylate and silica such as the compound Rhenofit® TRIM'S marketed by LANXESS in a proportion of between 0.5 phr and 2 phr, for example 1 phr.

The pipe 1 further comprises an intermediate bonding layer 12 arranged between the inner layer 10 and the outer layer 16. The inner and outer layers 10, 16 are made of elastomeric materials of different nature. The intermediate layer 12 therefore has the function of ensuring the bond between the inner and outer layers 10, 16. The intermediate layer has a thickness as measured along the transverse axis Y of between 0.1 mm and 2 mm. The intermediate layer 12 is formed of a third material comprising a mixture of elastomers of an ethylene-propylene copolymer, in particular an ethylene-propylene terpolymer and a non-conjugated diene (EPDM), with one of the following elastomers:

an ethylene vinyl acetate (EVA) copolymer, or
a polyacrylate (ACM), or
an ethylene acrylate copolymer (EAC).

The ethylene acrylate copolymer is for example VAMAC® D.

Advantageously, the proportions of EPDM and EVA, or ACM or AEM in the third material are equal.

The third material is advantageously vulcanized with peroxide or sulphur. The peroxide is for example selected from 1,3 1,4bis(terbutylperoxyisopropyl)benzene, di-(2 tertiarybutyl isopropyl)benzene peroxide, a dicumyl peroxide and (1,1' di tertiarybutylperoxy)-3,3,5-trimethylcyclohexane. Advantageously, the first material comprises vulcanisation activators comprising for example cyanurate such as triallyl cyanurate (TAC) or triallyl isocyanurate (TAIC).

Preferably, the pipe 1 further comprises a reinforcing layer 14. The reinforcing layer 14 is used to reinforce the pipe 1 against internal radial forces related to the pressure of the fluid. The reinforcing layer 14 is a tubular layer for example arranged between the intermediate layer 12 and the outer layer 16. According to another embodiment, the reinforcing layer 14 is embedded in the outer layer 16. According to this embodiment, the reinforcing layer 14 is arranged in the thickness of the outer layer 16.

The reinforcing layer 14 is a textile layer. The textile layer is for example a knitted textile layer. The reinforcing layer 14 comprises yarns. The yarns are, for example, polyamide (PA) yarns and in particular aromatic polyamide or polyethylene terephthalate (PET) or polyester or rayon yarns. The yarns have, for example, a dtex number of between 1000 dtex and 4000 dtex.

The pipe 1 according to the invention is used, for example, in an engine of a vehicle. The engine is, for example, an internal combustion, electric, hybrid or hydrogen engine.

The vehicle is for example a motor vehicle. The pipe 1 according to the invention composes for example a cooling circuit for such a vehicle. The cooling circuit is for example a low pressure, low temperature circuit.

According to another example, the vehicle is an aerial vehicle, such as an aircraft, or a marine vehicle.

Figure 2:
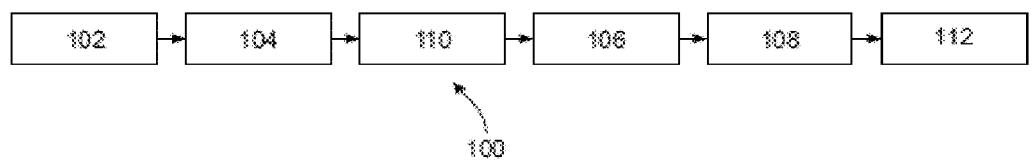
FIG. 2 is a synoptic diagram of a manufacturing method of the pipe of FIG. 1.

A method 100 for manufacturing the pipe 1 according to the invention will now be described with reference to FIG. 2.

The method 100 comprises the following steps:
(102) forming the inner layer 10,
(104) forming the intermediate layer 12 around the inner layer 10,
(106) forming the outer layer 16.

The inner, intermediate and outer layers 10, 12, 16 are for example formed by extrusion.

The steps 102 and 104 may be performed simultaneously by co-extrusion of the inner and intermediate layers 10, 12.

The inner, intermediate and outer layers 10, 12, 16 may be pre-vulcanized during the forming steps 102, 104, 106.

The method 100 further comprises the following step:
(108) vulcanizing the inner, intermediate and outer layers 10, 12, 16. The pipe 1 may be arranged for example in an autoclave at a pressure of for example between 5 bar and 10 bar.

The method 100 optionally comprises a step 110 of arranging the reinforcing layer 14 around the intermediate layer prior to the step 106 of forming the outer layer 16.

The method 100 optionally comprises a step 112 of post-curing the pipe 1 after the vulcanization step 108. The post-curing step 112 is for example performed at a temperature between 100° C. and 200° C., preferably between 150° C. and 180° C. The post-curing step 112 is for example carried out for a time of between 1 hour and 10 hours, preferably between 3 hours and 5 hours. The post-curing step further improves the fire resistance of the outer layer 16 without degrading its mechanical properties.

EXAMPLES

Example 1

Fire Resistance of the Outer Layer 16

Several outer layers 16-1, 16-2, 16-3, 16-4 were formed by extrusion based on the compositions described in Table 1. Then the outer layers 16-1, 16-2, 16-3, 16-4 were vulcanised.

The outer layers 16-1, 16-2, 16-3, 16-4 were then subjected to a vertical burning test according to FIG. 8-1 of UL 94-V standard as published on 14 Feb. 2013. The results are presented in Table 2.

The results showed that the outer layers 16-2, 16-3, 16-4 in the Table 1 comply with UL 94-V-0 standard and are therefore fire resistant.

However, the outer layer 16-1 does not comply with UL 94-V-0 standard. This is because the fire retardant content is insufficient.

In addition, the results show that the absence of EPDM in the second material greatly improves the fire resistance of the outer layer 16-3.

A second series of vertical burning tests according to FIG. 8-1 of the UL 94-V standard as published on 14 Feb. 2013 was carried out on the layers 16-1, 16-2, 16-3, 16-4 which were previously subjected to a post-curing step at a temperature of 175° C. for 4 hours.

The results also showed that the fire resistance of layers 16-1, 16-2, 16-3, 16-4 is greatly improved compared to layers not subjected to the post-curing step.

TABLE 1

| Compounds | Proportion (phr) | | | |
|---|---|---|---|---|
| | Outer layer 16-1 | Outer layer 16-2 | Outer layer 16-3 | Outer layer 16-4 |
| EVA | 100 | 100 | 100 | 100 |
| Aluminium hydroxide | 40 | 100 | 100 | 150 |
| Silica | 35 | 35 | 35 | 35 |
| Vulcanisation activator | 1 | 1 | 1 | 1 |
| Vulcanising agent | 3 | 3 | 3 | 3 |
| EPDM | 15 | 15 | 0 | 15 |

TABLE 2

| Outer layer | Residual burning time after 1st flame (seconds) t1 | Residual burning time and incandescence after 2$^{nd}$ flame (seconds) t2 + t3 |
|---|---|---|
| 16-1 | 0.8 | 121 |
| 16-2 | 0 | 7 |
| 16-3 | 0 | 0 |
| 16-4 | 0 | 10 |

Example 2

Mechanical Properties of the Outer Layer

The elongation at break and modulus of elasticity of the above outer layers 16-1, 16-2, 16-3, 16-4 were measured according to ISO37:2017. The results are presented in Table 3 below.

The results show that the elongation at break and the modulus of elasticity of layer 16-4 are degraded compared to layers 16-1, 16-2, 16-3. The results thus show that a too high proportion of flame retardant drastically reduces the mechanical properties of the outer layer 16.

TABLE 3

| Outer layer 16 | Elongation at break (%) | Modulus of elasticity (MPa) |
|---|---|---|
| 16-1 | 295 | 2.1 |
| 16-2 | 246 | 2.7 |
| 16-3 | 232 | 2.8 |
| 16-4 | 158 | 3.7 |

The invention claimed is:

1. A pipe for conveying a fluid, in particular a coolant, for a vehicle, the pipe having a multi-layer structure and comprising:
    an inner layer defining an inner passage for fluid circulation, the inner layer being formed of a first material comprising an elastomer selected from ethylene-propylene copolymers,
    an outer layer formed of a second material comprising:
        an elastomer selected from ethylene-vinyl acetate copolymers according to a proportion of at least 50 phr, and
        a flame retardant in a proportion of at least 50 phr, and
    an intermediate bonding layer arranged between the inner layer and the outer layer and comprising a mixture of an ethylene-propylene copolymer with an ethylene-vinyl acetate copolymer or a polyacrylate or an ethylene acrylate copolymer.

2. The pipe according to claim 1, characterised in that the flame retardant is selected from metal hydroxides, for example aluminium hydroxide or magnesium hydroxide or a mixture thereof.

3. The pipe according to claim 1, characterized in that the flame retardant is selected from phosphorus compounds, for example organophosphorus compounds or nitrogen phosphorus compounds or chlorophosphates or metal phosphinates or a mixture thereof.

4. The pipe according to claim 1, characterized in that the proportion of flame retardant is at least 70 phr, preferably at least 100 phr.

5. The pipe according to claim 1, characterised in that the second material is vulcanized with peroxide.

6. The pipe according to claim 1, characterised in that the second material is free of elastomer selected from ethylene-propylene copolymers.

7. The pipe according to claim 1, characterised in that the ethylene-propylene copolymer of the first material is an ethylene propylene terpolymer and a non-conjugated diene.

8. The pipe according to claim 1, characterised in that the proportion of the ethylene-propylene copolymer of the first material is 100 phr.

9. The pipe according to claim 1, characterized in that the proportion of the ethylene-vinyl acetate of the second material is at least 70 phr, preferably 100 phr.

10. The pipe according to claim 1, characterised in that it comprises a reinforcing layer arranged between the outer layer and the intermediate layer or embedded in the outer layer.

11. The pipe according to claim 1, characterised in that the second material comprises reinforcing fillers.

12. The pipe according to claim 11, characterised in that the reinforcing fillers comprise silica in a proportion less than or equal to 50 phr, preferably less than or equal to 40 phr.

13. The pipe according to claim 1, characterised in that the second material comprises additives, the proportion of each additive being less than or equal to 10 phr, preferably less than or equal to 5 phr.

14. The pipe according to claim 13, characterised in that the additives comprise carbon black.

15. A cooling circuit for a vehicle, characterised in that it comprises a pipe according to claim 1.

* * * * *